United States Patent
Holmes et al.

(10) Patent No.: US 10,300,905 B2
(45) Date of Patent: May 28, 2019

(54) ELECTRIC VEHICLE DRIVE USING COMBINED DIFFERENTIAL AND REDUCTION GEARING

(71) Applicant: GM Global Technology Operations LLC, Detroit, MI (US)

(72) Inventors: Alan G. Holmes, Clarkston, MI (US); Min-Joong Kim, Troy, MI (US); Edward A. Rapa, Jr., Waterford, MI (US); Brendan M. Conlon, Rochester Hills, MI (US); Joseph R. Littlefield, Sterling Heights, MI (US); Donald L. Dusenberry, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 113 days.

(21) Appl. No.: 15/608,384

(22) Filed: May 30, 2017

(65) Prior Publication Data
US 2018/0345949 A1 Dec. 6, 2018

(51) Int. Cl.
| | |
|---|---|
| *B60W 10/115* | (2012.01) |
| *F16H 61/70* | (2006.01) |
| *B60L 15/20* | (2006.01) |
| *F16H 3/44* | (2006.01) |
| *B60L 50/50* | (2019.01) |

(52) U.S. Cl.
CPC ............ *B60W 10/115* (2013.01); *B60L 15/20* (2013.01); *F16H 61/702* (2013.01); *B60L 50/50* (2019.02); *F16H 2003/442* (2013.01)

(58) Field of Classification Search
CPC ....... B60W 10/115; B60L 15/20; B60L 11/18; F16H 61/702; F16H 2003/442
See application file for complete search history.

(56) References Cited

U.S. PATENT DOCUMENTS

| | | | | |
|---|---|---|---|---|
| 2005/0064993 | A1* | 3/2005 | Ginther | ................. B60K 23/04 477/166 |
| 2013/0324348 | A1* | 12/2013 | Ross | ...................... F16H 48/36 475/224 |
| 2017/0241532 | A1* | 8/2017 | Isono | ...................... F16H 48/36 |
| 2017/0307055 | A1* | 10/2017 | Scharr | ..................... B60K 1/00 |

\* cited by examiner

*Primary Examiner* — Jacob S. Scott
*Assistant Examiner* — Murad Jahmani
(74) *Attorney, Agent, or Firm* — Harness, Dickey & Pierce, P.L.C.

(57) ABSTRACT

An electric vehicle drive system includes an electric motor, first and second planetary gear sets, including sun gear, carrier and ring gear members, first and second output shafts, and a housing. The members of the first planetary gear set are connected with the electric motor, the first output shaft, and a member of the second planetary gear set. The members of the second planetary gear set are connected with the first planetary gear set, the housing, and the second output shaft. The first planetary gear set provides differential reduction and the second planetary gear set provides reversal and reduction. Optional clutches can provide the function of a limited slip differential and distribute torque preferentially to one output shaft or the other.

19 Claims, 6 Drawing Sheets

ELECTRIC VEHICLE DRIVE USING COMBINED DIFFERENTIAL AND REDUCTION GEARING

FIELD

The present disclosure relates to electric vehicles and more particularly to an electric vehicle drive system using combined differential and reduction gearing.

BACKGROUND

This section provides background information related to the present disclosure which is not necessarily prior art.

Most automobiles in current use are driven by fuel engines which experience a great deal of mechanical loss and have low energy efficiency, thereby consuming a lot of energy and causing environmental pollution. Electric vehicles operate using stored electric energy for powering an electric motor. As battery technology has improved, the popularity of hybrid electric and electric vehicles has increased over the last several years. However, the packaging requirements for traditional electric motor drive systems have influenced the vehicle designs and efficiency. Accordingly, it is desirable to provide an electric drive that has a more compact arrangement and improved efficiency.

SUMMARY

This section provides a general summary of the disclosure, and is not a comprehensive disclosure of its full scope or all of its features.

An electric vehicle drive system includes an electric motor having an output shaft. A differential planetary gear set includes a first sun gear connected to the output shaft of the electric motor. A plurality of first planet gears are supported by a first planet carrier and in meshing engagement with the first sun gear and a first ring gear. A reversal planetary gear set includes a second sun gear rotatably connected to the first ring gear, a plurality of second planet gears supported by a second planet carrier and in meshing engagement with the second sun gear and a second ring gear. A first axle shaft is rotatably connected to the first planet carrier. A second axle shaft is rotatably connected to the second planet carrier. A first optional clutch can rotatably connect the first and second planet carriers. Second and third optional clutches can limit the torque transmitted by the first and second axle shafts, respectively. An optional torque transfer device can be rotatably connected with one of the first carrier, the first ring gear, and the second carrier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1A:
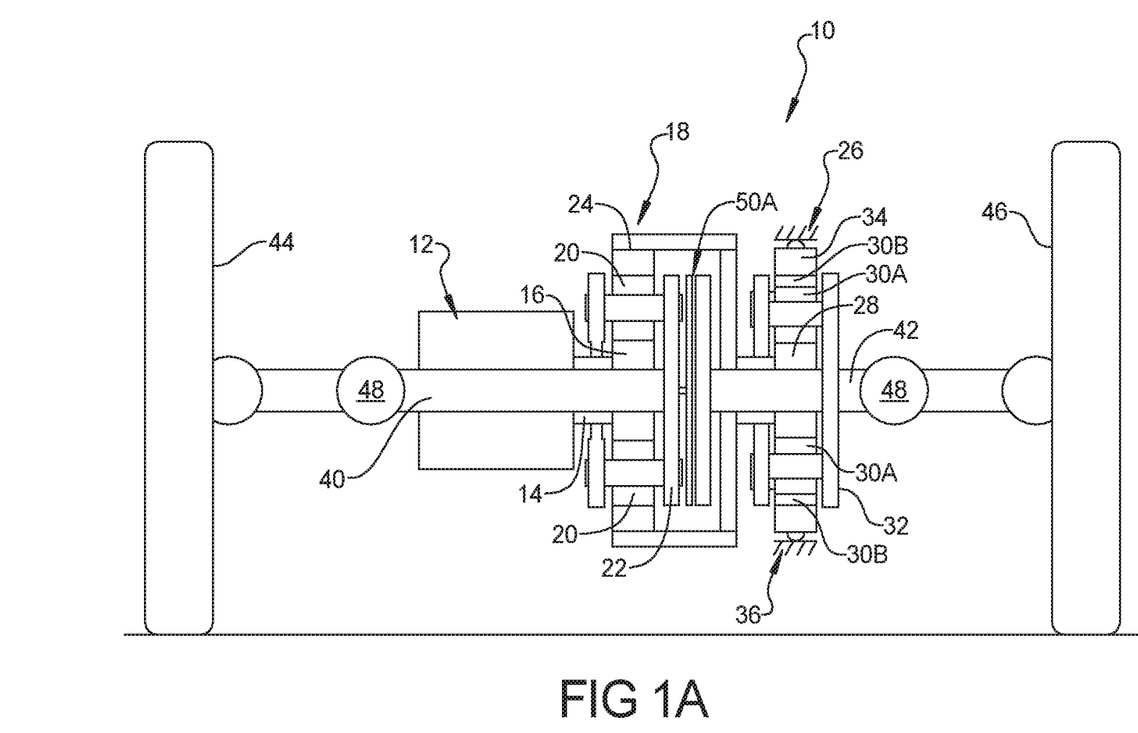
FIG. 1A is a schematic view of the electric vehicle drive system according to the principles of present disclosure.

With reference to FIG. 1A, an electric vehicle drive system 10 will now be described. Electric vehicle drive system 10 includes an electric motor 12 having an output shaft 14 that is drivingly connected to a sun gear 16 of a differential planetary gear set 18. The differential planetary gear set 18 includes a plurality of planet gears 20 that are supported by a planet carrier 22 and are in meshing engagement with the sun gear 16 and a ring gear 24. A reversal planetary gear set 26 is provided with a sun gear 28 that is drivingly connected to the ring gear 24 of the differential planetary gear set 18. The reversal planetary gear set 26 includes a plurality of inner planet gears 30A and outer planet gears 30B that are supported by a planet carrier 32 and are in meshing engagement with the sun gear 28 and a ring gear 34, respectively. That is, each of the inner planet gears 30A is in meshing engagement with the sun gear 28 and one of the outer planet gears 30B and each of the outer planet gears 30B is in meshing engagement with one of the inner planet gears 30A and the ring gear 34. The ring gear 34 can be connected to a controllable disconnect brake 36 that can prevent the ring gear 34 from rotating. A first axle shaft 40 is connected to the planet carrier 22 of the differential planetary gear set 18 and a second axle shaft 42 is connected to the planet carrier 32 of the reversal planetary gear set 26. Each of the axle shafts 40 and 42 are connected to a pair of drive wheels 44, 46, respectively and can include a CV joint 48 in the connection to each of the drive wheels. The differential planetary gear set 18, the reversal planetary gear set 26, the electric motor 12 and each of the axle shaft 40, 42 are concentric so as to rotate about a common axis. In addition, the first axle shaft 40 extends through a center opening in the electric motor 12. An optional first clutch 50A can also be provided in connection between the first and second axle shafts 40, 42 to limit relative rotation therebetween, thus serving as a limited slip differential clutch.

Figure 1B:
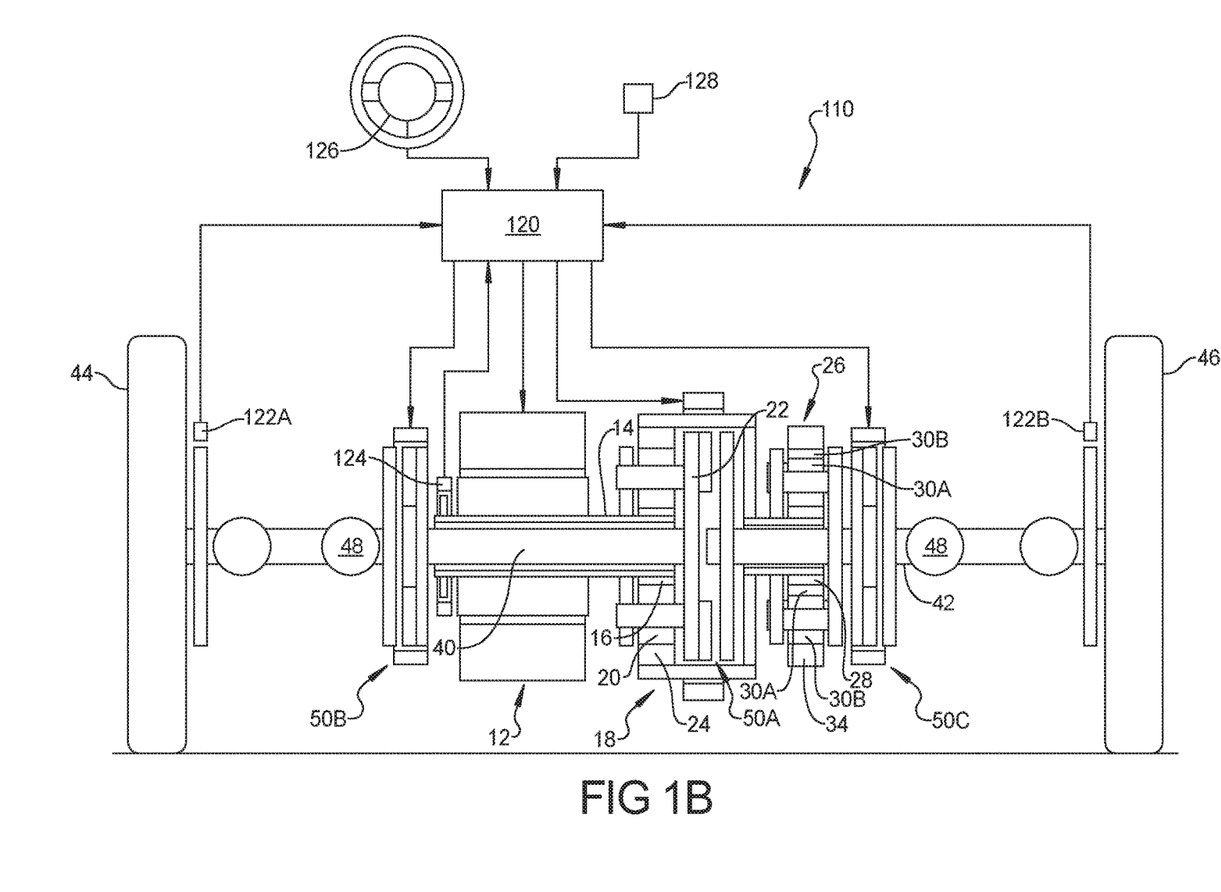
FIG. 1B is a schematic view of the same also including optional second and third clutches.

With reference to FIG. 1B, an alternative electric vehicle drive system 110 includes a first axle-to-axle clutch 50A second and third axle clutches 50B, 50C provided along the first and second axle shafts 40, 42. The drive system 110 further includes a controller 120 that can receive inputs from speed sensors 122A, B associated with each wheel 44, 46, a motor speed sensor 124 a steering wheel position sensor 126 and an acceleration sensor (such as a yaw rate sensor) 128.

The controller 120 provides output signals to control the electric motor 12 as well as the clutches 50A, 50B, and 50C to provide torque vectoring to accommodate for providing improved vehicle handling during turns. In particular, controlled engagement of the clutches 50A, 50B and 50C allow for better torque distribution to the drive wheels 44, 46 while they are rotating at different speeds.

Figure 1C:
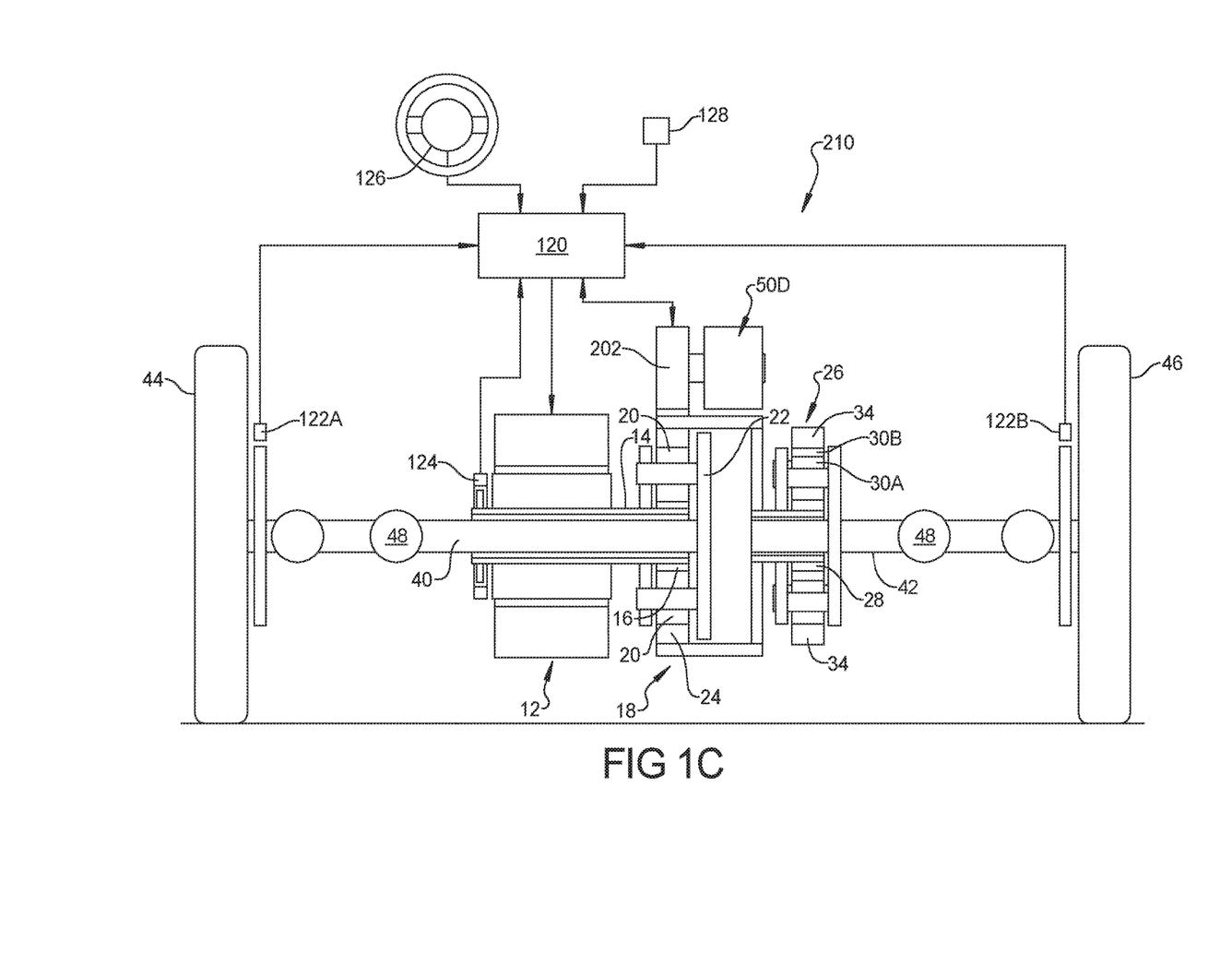
FIG. 1C is a schematic view of the electric vehicle drive system according to the principles of present disclosure also including an optional torque transfer device.

With reference to FIG. 1C, an alternative electric vehicle drive system 210 includes an optional torque transfer device 50D, such as a hydraulic motor or a secondary electric motor. As shown in FIG. 1C, the torque transfer device 50D is a secondary electric motor drivingly connected to the ring gear 24 of the differential planetary gear set 18 by an intermediate gear 202. Alternatively, the torque transfer device 50D can be rotatably connected with one of: the first axle shaft 40 and thereby with the planet carrier 22 of the differential planetary gear set 18, the second axle shaft and thereby with the planet carrier 32 of the reversal planetary gear set 26. The secondary electric motor 50D can be controlled by a controller 120 to add drive torque or drive resistance to provide torque vectoring to the drive wheels for providing improved vehicle handling during turns. In particular, controlled engagement of the torque transfer device 50D allows for better torque distribution to the drive wheels 44, 46 while they are rotating at different speeds.

Figure 1D:
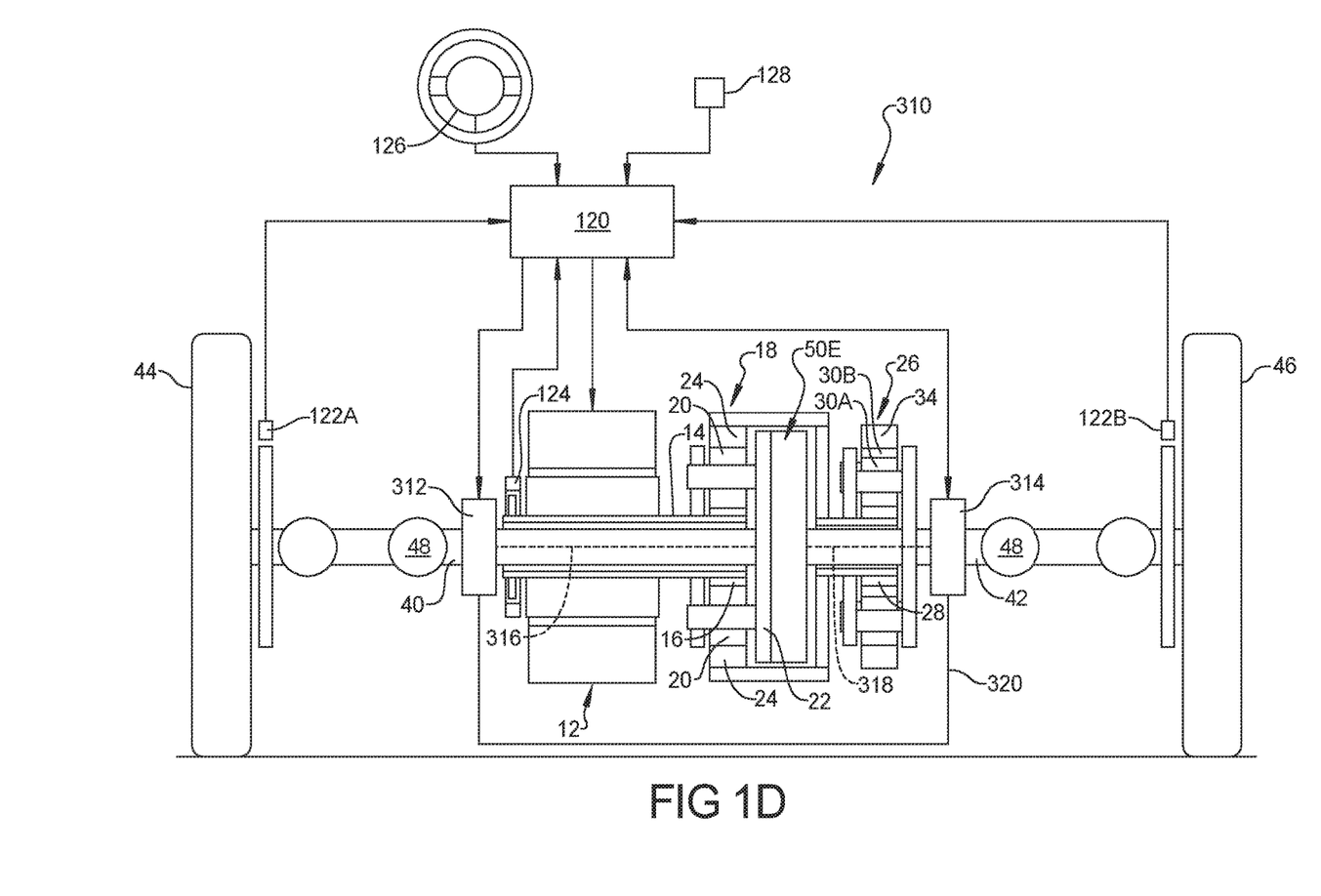
FIG. 1D is a schematic view of the electric vehicle drive system according to the principles of present disclosure also including a hydraulic torque transfer device for providing torque vectoring.

With reference to FIG. 1D, an alternative electric vehicle drive system 310 includes an optional torque transfer device 50E, such as a hydraulic motor. As shown in FIG. 1D, the torque transfer device 50E is drivingly connected to the planetary carrier of the differential planetary gear set 18. A first hydraulic pump 312 includes a fixed housing and a rotor inside that is attached to the first axle shaft 40, while a second hydraulic pump 314 includes a fixed housing and a rotor inside that is attached to the second axle shaft 42. First and second oil passages 316, 318 are provided within the first and second axle shafts 40, 42 and in communication with the hydraulic motor 50E. A third oil passage 320 is provided between the first hydraulic pump 312 and the second hydraulic pump 314 for completing the hydraulic circuit. A rotational speed difference between the first and second hydraulic pumps 312, 314 causes the hydraulic motor 50E to add drive torque to the faster turning of the wheels to provide torque vectoring to the drive wheels for providing improved vehicle handling during turns. In particular, the hydraulic motor 50E allows for better torque distribution to the drive wheels 44, 46 while they are rotating at different speeds.

Figure 2:
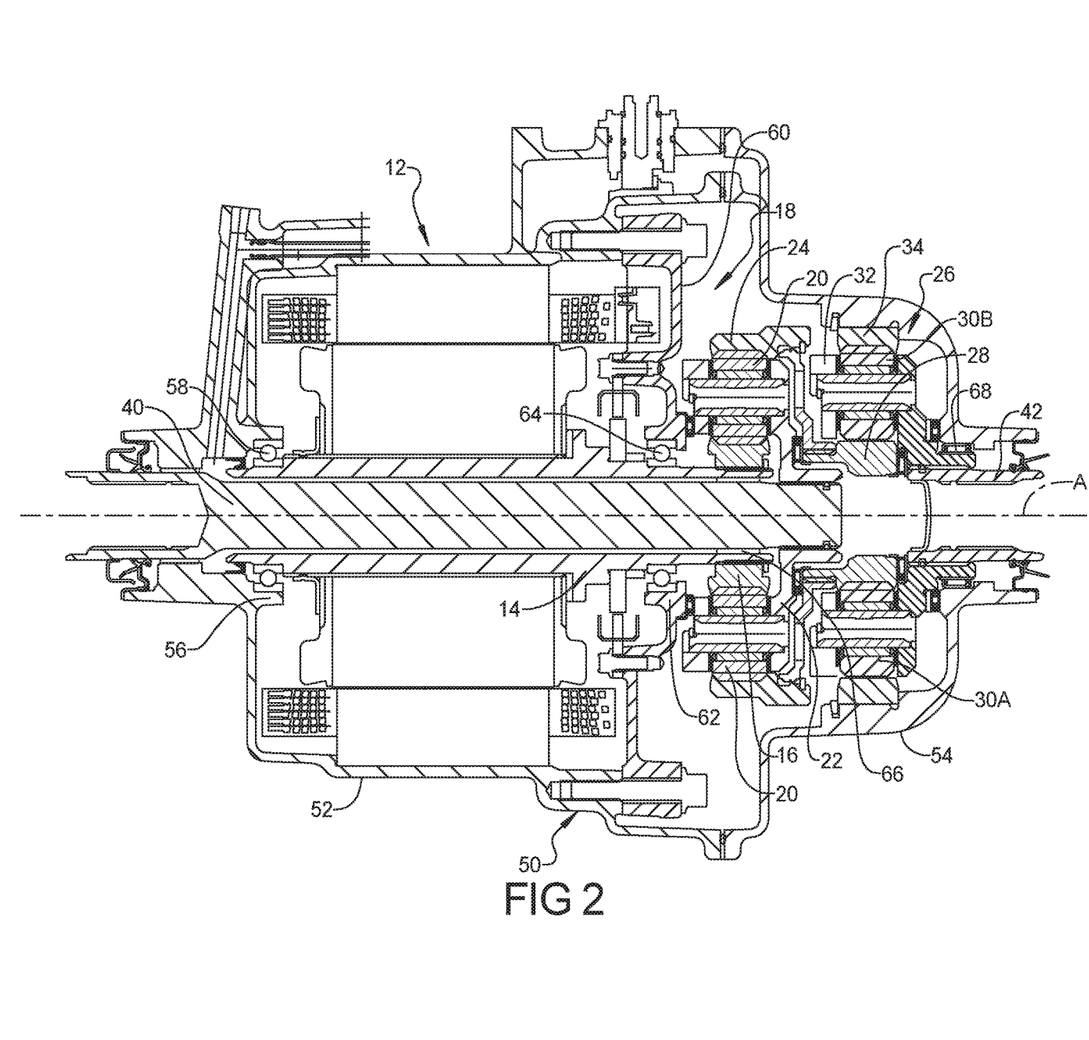
FIG. 2 is a cross-sectional view of the differential planetary gear set and reversal planetary gear set according to the principles of the present disclosure.

With reference to FIG. 2, a detailed cross-sectional view of the electric motor 12, the differential planetary gear set 18 and the reversal planetary gear set 26 will now be described wherein the same reference numerals are utilized with respect to FIG. 1. As shown in FIG. 2, the electric motor 12 includes an output shaft 14 that is drivingly connected to a sun gear 16 of a differential planetary gear set 18. The differential planetary gear set 18 includes a plurality of planet gears 20 that are supported by a planet carrier 22 and are in meshing engagement with the sun gear 16 and a ring gear 24. A reversal planetary gear set 26 is provided with a sun gear 28 that is drivingly connected to the ring gear 24 of the differential planetary gear set 18. The reversal planetary gear set 26 includes a plurality of inner planet gears 30A and outer planet gears 30B that are supported by a planet carrier 32 and are in meshing engagement with the sun gear 28 and a ring gear 34, respectively. The ring gear 34 is supported and prevented from rotating by a housing section 54. A first axle shaft 40 is connected to the planet carrier 22 of the differential planetary gear set 18 and a second axle shaft 42 is connected to the planet carrier 32 of the reversal planetary gear set 26. The electric motor 12, differential planetary gear set 18 and reversal planetary gear set 26 are all disposed within a common housing 51 including housing sections 52, 54 which are bolted together. The housing section 52 houses the electric motor 12 while the housing section 54 houses the differential planetary gear set 18 and the reversal planetary gear set 26. The housing section 52 includes a bearing support portion 56 for supporting a bearing 58 that rotatably supports the motor output shaft 14. An intermediate plate 60 is disposed within the housing 51 and includes a bearing support portion 62 for supporting a bearing 64 for supporting a second end of the motor output shaft 14. A needle bearing 66 is supported by the motor shaft 14 near an end of the axle shaft 40 for rotatably supporting the planet carrier 22 of the differential planetary gear set 18. The housing section 54 supports a needle bearing 68 for supporting the planet carrier 32 of the reversal planetary gear set 26.

The electric vehicle drive system according to the principles of the present disclosure can provide a 6:1 to 10:1 speed reduction from an electric motor to the wheels by combining speed reduction with differential action using a simple planetary gear set as a differential and a reversing gear set on one of the two outputs of the simple planetary gear set. The reversal gear set provides reaction torque to the speed-reducing planetary gear set at negative speed instead of zero speed, increasing the effective ratio of the speed-reducing planetary gear set. The speed reduction and differential action are integrated into a single step instead of provided in separate stages. The system reduces spin losses and further reduces the cross-vehicle axial distance for the coaxial electric motor drive axle as compared to two stages of planetary gearing and a differential.

The electric vehicle drive system according to the principles of the present disclosure can provide that same function as the well-known limited slip differential by using a clutch that rotatably connects the two wheels, with a fixed axial pre-load on the clutch or a variable, controllable load on the clutch. Up to the slip limit of this clutch, additional clutches can distribute different amounts of torque to the two outputs, such as lesser amount of torque to the wheel on the inside of a turn and a greater amount of torque to the wheel on the outside of a turn. An alternative to additional clutches is to add torque to one of the outputs or to subtract torque from it with a secondary motor.

Figure 3:
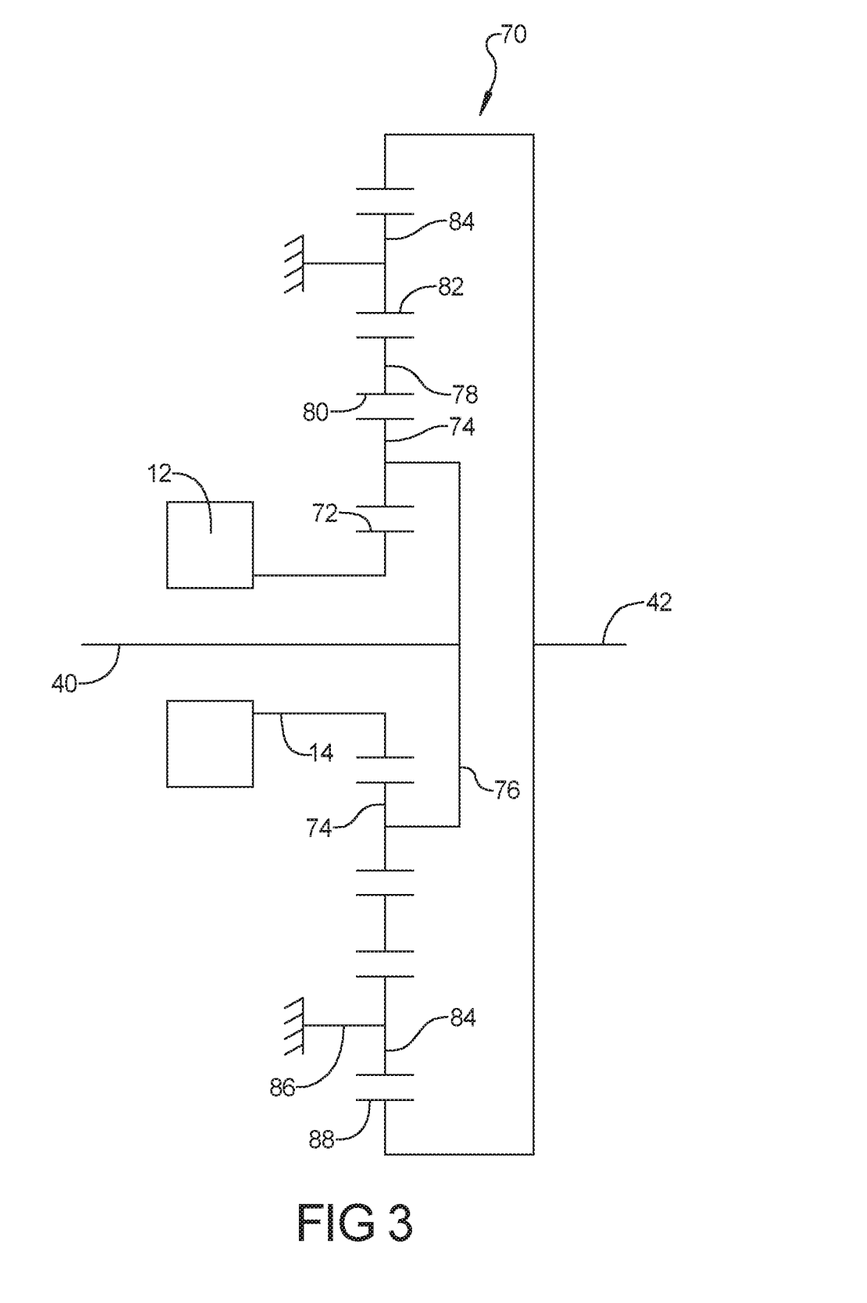
FIG. 3 is a schematic view of an alternative stacked planetary gear set for use in the electric vehicle drive system according to the principles of the present disclosure.

With reference to FIG. 3, an alternative stacked planetary gear system 70 is shown and includes a sun gear 72 that is connected to the output shaft 14 of the electric motor 12. A plurality of first planet gears 74 are supported by a first planet carrier 76 and are in meshing engagement with the sun gear 72 and a ring gear 78. The ring gear 78 has internal gear teeth 80 and external gear teeth 82 that are in meshing engagement with a plurality of second planet gears 84 that are supported by a second planet carrier 86. The plurality of second planet gears 84 are also in meshing engagement with internal gear teeth of a second ring gear 88. The second planet carrier 86 can be fixedly mounted and or connected to a brake mechanism so that the second planet carrier 86 can be prevented from rotating. The first planet carrier 76 is rotatably connected to the first axle shaft 40 while the second ring gear 88 is connected to the second axle shaft 42. The stacked planetary gear set 70 has a compact axial profile for providing a driving connection between an electric motor and a pair of axle shafts. The sun gear 72, the plurality of first planet gears 74, the first planet carrier 76, and the ring gear 78 form a differential planetary gear set, dividing a forward input from the electric motor 12 into a forward output to the first axle 40 and a reverse output to a reversal gear set. The ring gear 78 and its external teeth 82 form a sun gear for the reversal planetary gear set. The ring gear 78 and its external teeth 82, the plurality of second planet gears 84, the second planet carrier 86, and the ring gear 88 form the reversal planetary gear set that reverses one of the outputs of the differential planetary gear set for the second axle 42 and makes the gear ratio between the electric motor 12 and the second axle 42 equal to the gear ratio between the electric motor 12 and the first axle 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric vehicle drive system, comprising:
an electric motor having an output shaft rotatable about an axis;
a differential planetary gear set including a first sun gear coaxial with and directly connected to the output shaft of the electric motor, a plurality of first planet gears supported by a first planet carrier and in meshing engagement with the first sun gear and a first ring gear;
a reversal planetary gear set including a second sun gear coaxial with and directly rotatably connected to the first ring gear, a plurality of second planet gears supported by a second planet carrier and in meshing engagement with the second sun gear and a second ring gear;
a first axle shaft rotatably connected to the first planet carrier; and
a second axle shaft rotatably connected to the second planet carrier.

2. The electric vehicle drive system according to claim 1, further comprising a disconnect brake on the second ring gear.

3. The electric vehicle drive system according to claim 1, further comprising a limited slip differential clutch connected between the first and second axle shafts.

4. The electric vehicle drive system according to claim 1, wherein said first axle shaft extends through an opening in the electric motor.

5. The electric vehicle drive system according to claim 1, wherein the electric motor, the differential planetary gear set and the reversal planetary gear set are all coaxial with the first and with the second axle shafts.

6. The electric vehicle drive system according to claim 1, further comprising a controller and a first sensor for sensing a rotational speed of the first axle and a second sensor for sensing a rotational speed of the second axle.

7. The electric vehicle drive system according to claim 6, further comprising a first axle clutch on the first axle shaft and a second axle clutch on the second axle shaft, wherein the controller controls engagement of the first and second axle shafts in response to the sensed rotational speeds of the first and second axle shafts.

8. The electric vehicle drive system according to claim 6, further comprising a secondary electric motor drivingly connected to a component of the differential planetary gear set or the reversal planetary gear set, wherein the controller controls the secondary electric motor in response to the sensed rotational speeds of the first and second axle shafts.

9. The electric vehicle drive system according to claim 1, further comprising a first pump on the first axle shaft, a second pump on the second axle shaft and a hydraulic motor in communication with the first and second pumps and drivingly connected to a component of the differential planetary gear set or the reversal planetary gear set.

10. A drive system, comprising:
an output shaft rotatable about an axis;
a differential planetary gear set including three members rotating about the axis:
  a first sun gear coaxial with and directly connected to the output shaft,
  a first ring gear,
  a first planet carrier supporting a plurality of first planet gears in meshing engagement with the first sun gear and the first ring gear;
a reversal planetary gear set including three members rotating about the axis:
  a second sun gear,
  a second ring gear,
  a second planet carrier supporting a plurality of second planet gears in meshing engagement with the second sun gear and the second ring gear;
a first axle shaft rotatably connected to one of the first ring gear and the first planet carrier; and
a second axle shaft rotatably connected to one of the second ring gear and the second planet carrier;
wherein the other of the first ring gear and the first planet carrier is coaxial with and directly rotatably connected with the second sun gear, and the other of the second ring gear and the second planet carrier is prevented from rotating.

11. The drive system according to claim 10, further comprising a limited slip differential clutch connected between the first and second axle shafts.

12. The drive system according to claim 10, wherein said first axle shaft extends through an opening in an electric motor.

13. The drive system according to claim 10, further comprising a controller and a first sensor for sensing a rotational speed of the first axle and a second sensor for sensing a rotational speed of the second axle.

14. The drive system according to claim 13, further comprising a first axle clutch on the first axle shaft and a second axle clutch on the second axle shaft, wherein the controller controls engagement of the first and second axle shafts in response to the sensed rotational speeds of the first and second axle shafts.

15. The drive system according to claim 13, further comprising an electric motor drivingly connected to a component of the differential planetary gear set or the reversal planetary gear set, wherein the controller controls the electric motor in response to the sensed rotational speeds of the first and second axle shafts.

16. The drive system according to claim 10, further comprising a first pump on the first axle shaft, a second pump on the second axle shaft and a hydraulic motor in communication with the first and second pumps and drivingly connected to a component of the differential planetary gear set or the reversal planetary gear set.

17. An electric vehicle drive system, comprising:
an electric motor having an output shaft;
a stacked planetary gear set including a first sun gear connected directly to the output shaft of the electric motor, a plurality of first planet gears supported by a first planet carrier and in meshing engagement with the first sun gear and a first ring gear, the first ring gear having internal gear teeth engaging the plurality of first planet gears and having external teeth disposed directly radially outward from the internal gear teeth and engaging a plurality of second planet gears that are supported by a second planetary carrier and are in meshing engagement with internal teeth of a second ring gear;
a first axle shaft rotatably connected to the first planet carrier; and
a second axle shaft rotatably connected to the second ring gear.

18. The electric vehicle drive system according to claim 17, wherein the electric motor, the differential planetary gear set and the reversal planetary gear set are all coaxial with the first axle shaft and with the second axle shaft.

19. The electric vehicle drive system according to claim 17, further comprising a limited slip differential clutch connected between the first and second axle shafts.

* * * * *